(12) United States Patent
Collins

(10) Patent No.: US 6,279,846 B1
(45) Date of Patent: Aug. 28, 2001

(54) DATA TAPE CARTRIDGE WITH MODIFIED HUB MOUNTING ARRANGEMENT

(75) Inventor: Leslie M. Collins, White Bear Lake, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/400,809

(22) Filed: Sep. 22, 1999

(51) Int. Cl.$^7$ .......................... G11B 23/087; G11B 23/04; B65H 75/11
(52) U.S. Cl. .......................... 242/345; 242/345.2; 242/614
(58) Field of Search .................................... 242/340, 345, 242/345.2, 614

(56) References Cited

U.S. PATENT DOCUMENTS

| | | | |
|---|---|---|---|
| 4,396,962 | * 8/1983 | Beaujean | 242/340 |
| 4,561,609 | * 12/1985 | Collins et al. | 242/345.2 |
| 5,092,537 | * 3/1992 | Eggebeen | 242/345.2 |
| 5,379,960 | * 1/1995 | Kaneda et al. | 242/345.2 |
| 5,513,815 | 5/1996 | Erickson et al. . | |
| 5,845,859 | * 12/1998 | Sato | 242/345 |
| 5,860,612 | 1/1999 | Runyon et al. . | |
| 5,881,960 | * 3/1999 | Christie | 242/345 X |
| 5,886,845 | 3/1999 | Kilaparti et al. . | |

FOREIGN PATENT DOCUMENTS 56-145549  * 11/1981 (JP) .................. 242/340 X

\* cited by examiner

*Primary Examiner*—Donald P. Walsh
*Assistant Examiner*—Minh-Chau Pham
(74) *Attorney, Agent, or Firm*—Eric D. Levinson (57) ABSTRACT

A tape cartridge including a cartridge housing, one or more tape hub pins substantially fixed at both ends to the cartridge housing, and tape hubs, carrying tape, e.g., magnetic tape, that are mounted around the tape hub pins for rotation within the cartridge housing. Also described is a method for preventing tilt of a tape hub including fitting a first end of the pin into a baseplate, which is part of the tape cartridge housing. The method also includes fitting a second end of the pin into a pin retention device formed into a cover, which is another part of the tape cartridge housing. The pin retention device of this method may take the form of a ring-like feature, provided in the cover, which retains the second end of the pin.

12 Claims, 7 Drawing Sheets

DATA TAPE CARTRIDGE WITH MODIFIED HUB MOUNTING ARRANGEMENT

TECHNICAL FIELD

The present invention relates to data storage media. More particularly, the present invention relates to arrangements for mounting a tape pack in a data tape cartridge.

BACKGROUND

A typical data tape cartridge has a housing that encloses a pair of rotatably mounted tape hubs about which data storage tape, e.g., magnetic tape, is wound. The tape hubs are each mounted around a central tape hub pin, which typically fixes the tape hub in place along two coordinate axes while allowing the tape hub to rotate freely. A belt-driven tape cartridge may include a drive roller, a belt, two or more belt rollers, and a tape access door. A drive mechanism drives a drive puck, which in turn drives the drive roller to move the belt. The belt causes the tape to move from one tape hub to the other. Tape hub pins typically are interference fit into a hole formed in the data cartridge baseplate, which forms part of the data cartridge housing. The interference fit fixes the hub pin at one end to provide an axis of rotation for the tape hub.

SUMMARY

The present invention provides a data tape cartridge in which both ends of each tape hub pin are substantially fixed to the tape cartridge housing. This feature generally prevents the pins from becoming tilted as a result of a shock load to the tape cartridge on any of its sides. When a data cartridge is dropped, or otherwise subjected to a shock load, the inertia of the tape hub and the tape wrapped around it may cause the tape hub pin to tilt from its original alignment. The alignment of the tape hub pin is critical to the ability of a read and write mechanism to correctly read data from or write data to the tape.

Valuable data can be lost when the tape hub pin is even slightly tilted. As new technology yields greater data storage densities, the storage volumes offered by data tape media similarly increase. With increased volumes, the value of the data stored on an individual tape cartridge ramps upward. Consequently, the problem of pin tilt in even a single storage cartridge becomes a greater concern. In the case of inoperability of an individual tape cartridge, large amounts of valuable data can be lost or corrupted. Data loss or corruption can result in the loss of productivity, time, and money. Therefore, data integrity is a paramount concern. Avoidance of tape hub pin tilt, in accordance with the present invention, can reduce the risk to data integrity.

A tape cartridge, in accordance with an embodiment of the present invention, includes a cartridge housing, one or more tape hub pins substantially fixed at both ends to the cartridge housing, and tape hubs, carrying data storage tape, that are mounted around the tape hub pins for rotation within the cartridge housing.

A method for preventing tilt of a tape hub pin, in accordance with another embodiment of the present invention, includes fitting a first end of the pin into a baseplate, which may form part of the tape cartridge housing. The method also includes fitting a second end of the pin into a pin retention device formed in a cover, which may form another part of the tape cartridge housing. The pin retention device may take the form of a ring-like feature, provided in the cover, that retains the second end of the pin.

Cartridges and methods, in accordance with the present invention, will be generally described herein as carrying magnetic tape. Tape hub pin mounting arrangements in accordance with the present invention can be readily adapted for other forms of tape media, however, such as optical tape.

Other advantages, features, and embodiments of the present invention will become apparent from the following detailed description and claims.

DETAILED DESCRIPTION

Figure 1:
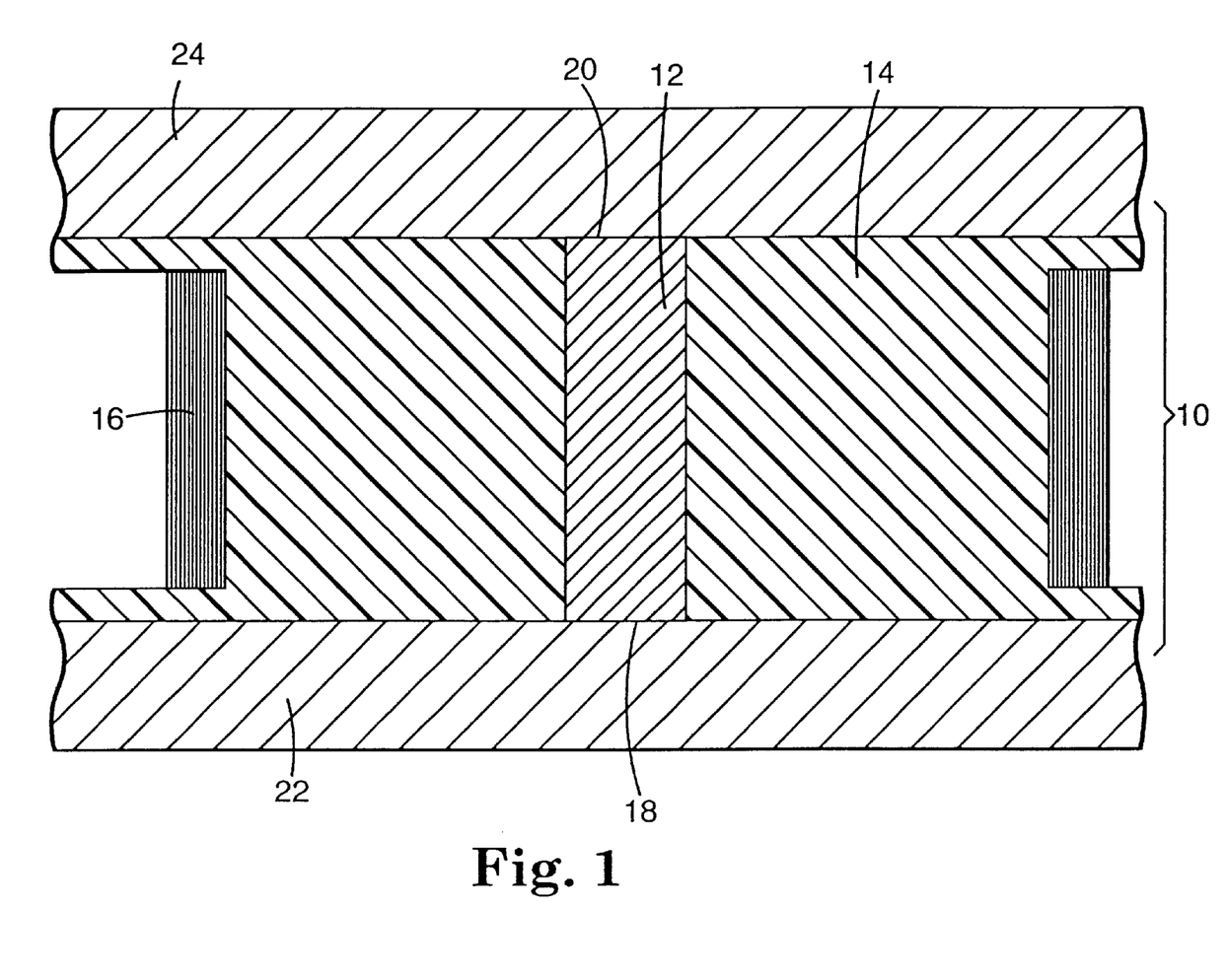
FIG. 1 is a cross-sectional view of a tape cartridge housing and tape hub pin in accordance with an embodiment of the present invention.

FIG. 1 is a cross-sectional view of a portion of a tape cartridge housing 10 and tape hub pin 12 in accordance with an embodiment of the present invention. The tape cartridge housing 10 can provide an enclosure for tape hubs 14, tape 16, and other components of a tape cartridge. Tape 16 may take the form of magnetic data storage tape. Tape hub pin 12 is substantially fixed to the tape cartridge housing 10 at both of its ends 18 and 20. Tape hub 14 is mounted about the tape hub pin 12 for rotation within tape cartridge housing 10. Baseplate 22 may be made of aluminum or any other durable material. A cover 24 and baseplate 22 form tape cartridge housing 10.

Figure 2:
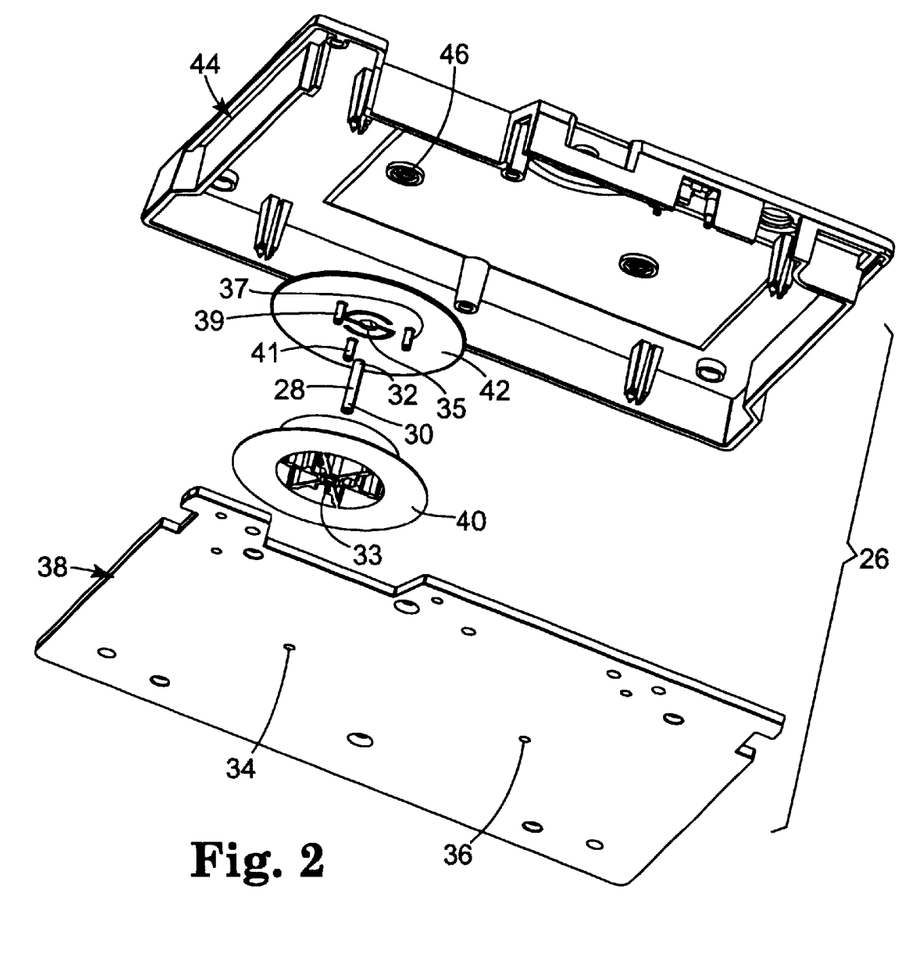
FIG. 2 is an exploded perspective view of a tape cartridge in accordance with an embodiment of the present invention.

FIG. 2 is an exploded perspective view of a tape cartridge 26 in accordance with an embodiment of the present invention. FIG. 2 illustrates the features of a tape cartridge housing 10 as shown in FIG. 1 in greater detail. Tape hub pin 28 having first end 30 and second end 32 is shown. The first end 30 of tape hub pin 28 may be fixed into hole 34 or hole 36 formed in the baseplate 38, e.g., by interference fitting. A tape hub 40 may then be mounted about the tape hub pin 28 for rotation within the tape cartridge housing 10 (FIG. 1). In particular, end 30 of pin 28 extends through an aperture 33 of hub 40. A flange 42 is mounted on and fixed to the tape hub 40 so that flange 42 and tape hub 40 may rotate within the tape cartridge housing 10 (FIG. 1) as a unit. Flange 42 includes an aperture 35 for receipt of end 32 of pin 28. The tape cartridge housing 10 (FIG. 1) includes the baseplate 38 and a cover 44.

When tape cartridge 26 is assembled, the second end 32 of the tape hub pin 28 protrudes through aperture 35 of flange 42 and makes contact with an inner surface of the cover 44. Flange 42 includes posts 37, 39, 41, which engage mounting holes (not shown) within hub 40 upon assembly. In this manner, the second end 32 of the tape hub pin 28 is substantially fixed to the cover 44. In this embodiment, a pin retention device 46, which may be a molded feature of the cover 44, captures the second end 32 of the tape hub pin 28.

Figure 3:
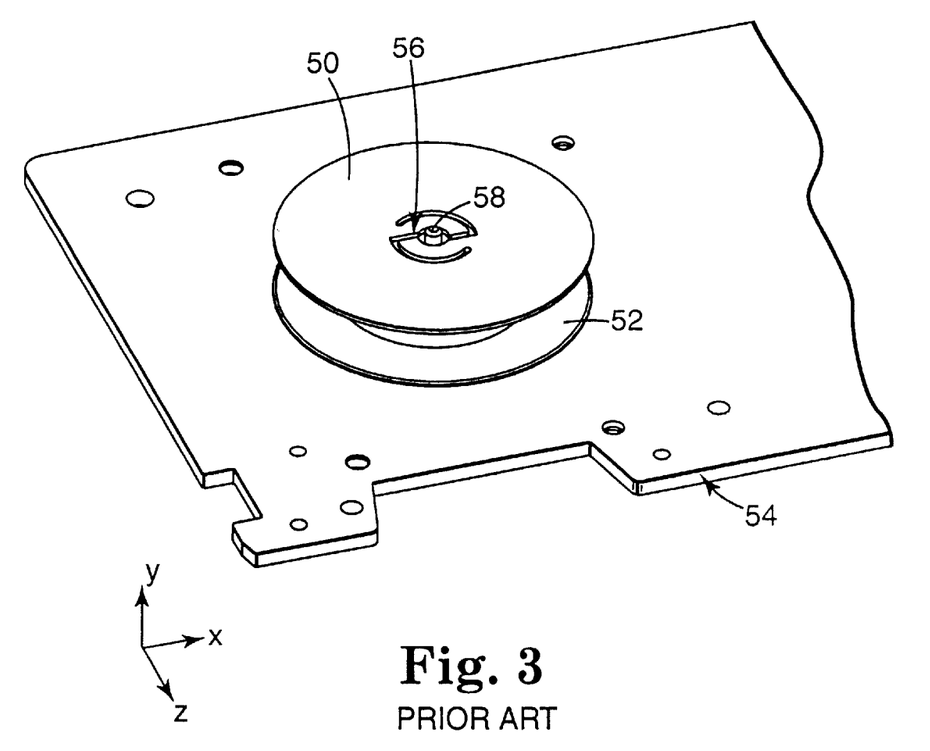
FIG. 3 is a perspective view of components of a conventional tape cartridge, where the tape hub pins are fixed at only at one end, upon assembly.

10 FIG. 3 is a perspective view of components of a conventional tape cartridge, where the tape hub pins are fixed at only at one end, as they would be assembled. From this perspective, the components of a conventional flange 50 are apparent. The flange 50 is mounted on and fixed to the tape hub 52. The flange 50 and tape hub 52 may then rotate within the tape cartridge housing 10 (FIG. 1) as a unit. It is desirable in tape cartridges that the tape hub 52 is loaded down to the baseplate 54 to restrict the tape hub 52 from moving in the y-coordinate direction i.e., in a direction normal to the baseplate 54. The downward force required is provided by a spring feature 56 of flange 50. The spring feature 56 may be a molded feature of the flange 50. A flange nib 58 deflects the spring feature 56 of the flange 50 when the nib 58 is pushed down, for instance, by a cover 44 (FIG. 2) of the tape cartridge housing 10 (FIG. 1). It should be apparent that this design would not secure a second end of a tape hub pin to the cover.

Figure 4:
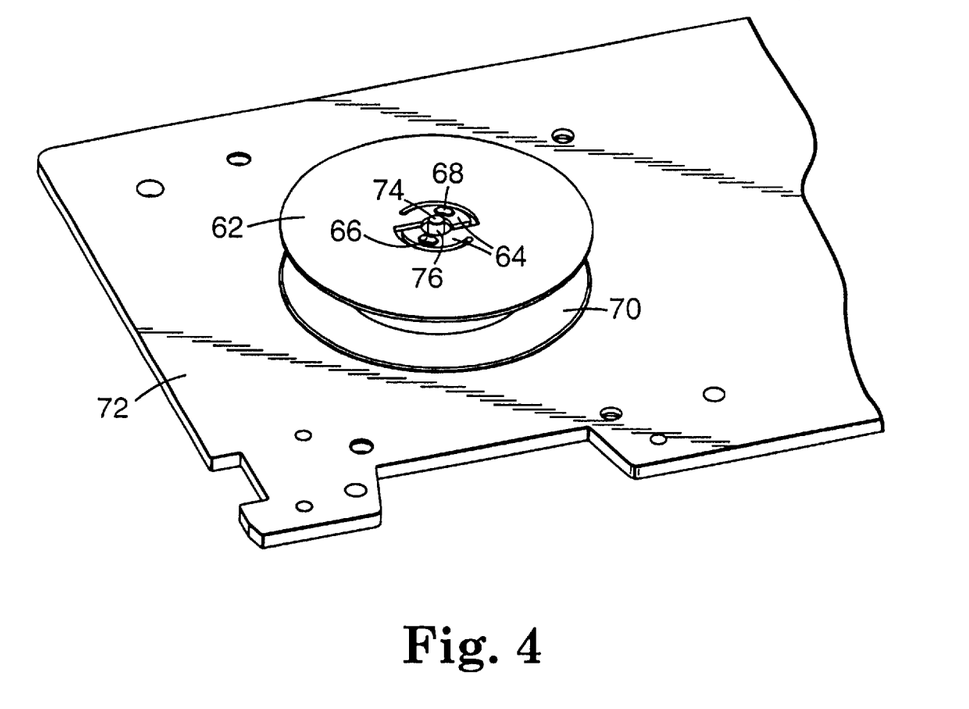
FIG. 4 is a top-perspective view of a hub and pin arrangement in accordance with an embodiment of the present invention.

FIG. 4 is a top-perspective view of a portion of a tape cartridge in accordance with an embodiment of the present invention. The tape cartridge appears as it would with cover 46 (FIG. 2) removed. Components of a flange 62 are visible. In particular, spring feature 64 may be a molded feature of the flange 62. Two flange nibs 66 and 68 can be located on spring feature 64 of the flange 62. Flange nibs 66 and 68 may contact an inner surface of the cover 44 (FIG. 2) of the tape cartridge. Nibs 66 and 68 provide the downward force to load the tape hub 70 down to the baseplate 72. In particular, when the nibs 66 and 68 contact the inner surface of the cover 44 (FIG. 2) the nibs 66 and 68 and the spring feature 64 are displaced toward the baseplate 72. A spring bias is exerted on the cover 44 (FIG. 2) and the flange 62. The cover 46 (FIG. 2) is fixed, so the spring bias acts to load the flange 62 and the tape hub 70 down to the baseplate 72. Second end 74 of the tape hub pin 76 protrudes above the flange 62 enabling second end 74 to be substantially fixed to, for instance, the cover 44 (FIG.2).

Figure 5:
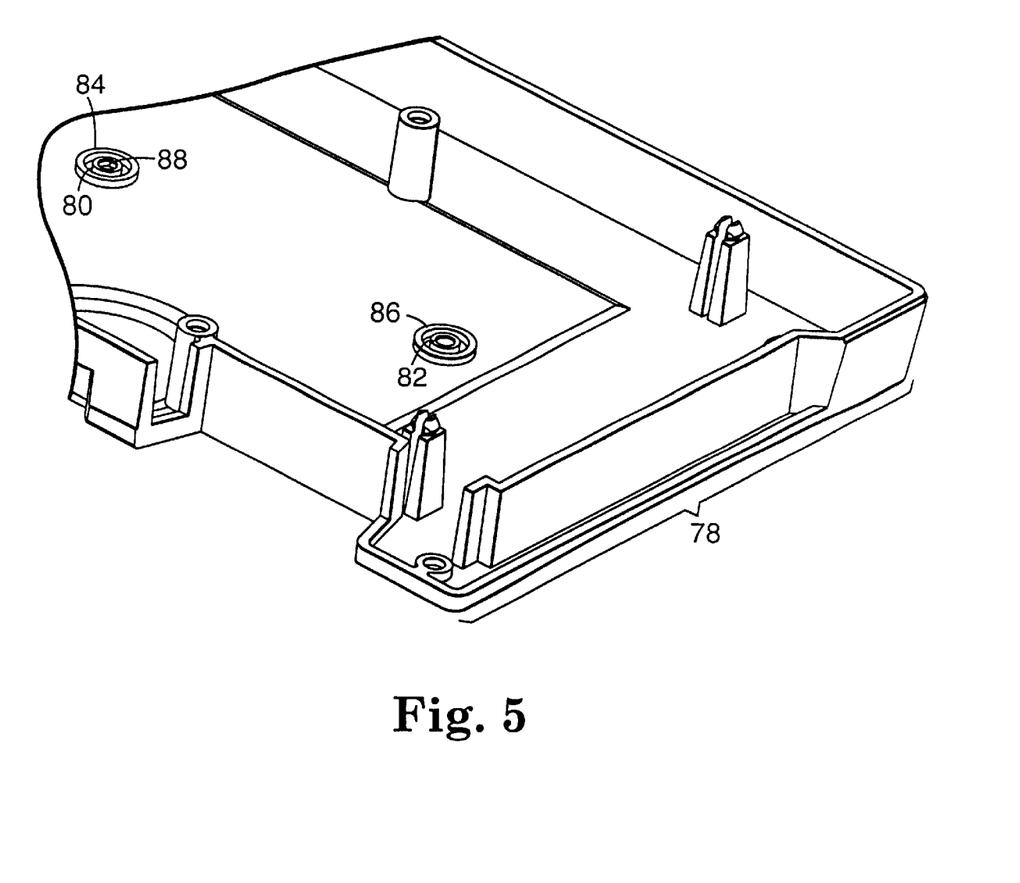
FIG. 5 is a perspective view of an embodiment of the cover of a tape cartridge in accordance with an embodiment of the present invention.

FIG. 5 is a perspective view of an embodiment of a cover 78 of a tape cartridge in accordance with the present invention. Two ring-like pin retention devices 80 and 82 and thrust rings 84 and 86 may be molded features of the tape cartridge cover 78. Retention devices 80 and 82 receive the second end 74 (FIG. 4) of the tape hub pin 76 (FIG. 4), which protrudes above the flange 62 (FIG. 4).

In an embodiment as shown in FIG. 5, ring-like pin retention devices 80 and 82 and thrust rings 84 and 86 together can be described as a combination of raised ring-like features on the inner surface of the cover 78. Each raised ring-like feature has an inner wall and an outer wall. The inner wall of an inner raised ring-like feature of the cover 78 consistent with this embodiment defines an annular space 88 for insertion of the second end 74 (FIG. 4) of a tape hub pin 76 (FIG. 4). In this way the second end 74 (FIG. 4) of the tape hub pin 76 (FIG. 4) may be substantially fixed.

Figure 6:
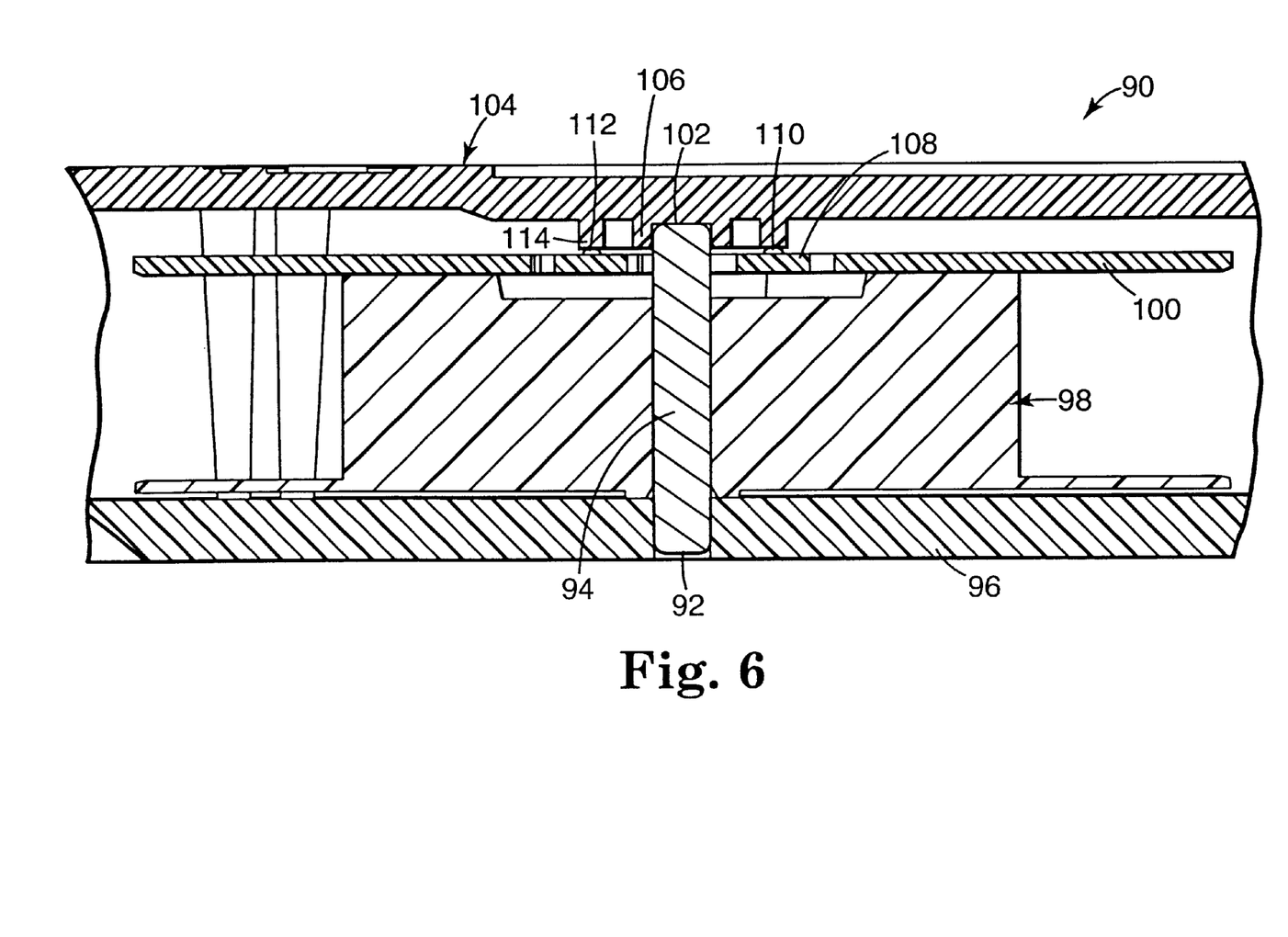
FIG. 6 is a cross-sectional view of a tape cartridge in accordance with an embodiment of the present invention.

FIG. 6 is a cross-sectional side view of a tape cartridge 90 in accordance with an embodiment of the present invention. First end 92 of tape hub pin 94 has been fit into baseplate 96. Tape hub 98 is mounted around tape hub pin 94, which projects through the center of the tape hub 98. Flange 100 is mounted and fixed to the tape hub 98 so that they may rotate as a unit. Second end 102 of tape hub pin 94 protrudes above the flange 100 and is substantially fixed to the cover 104 by being fit into the ring-like pin retention device 106.

The spring feature 108 of flange 100 and flange nibs 110 and 112 are visible. The flange nibs 110 and 112 make contact with the thrust ring 114, thus providing the downward force needed to load the tape hub 96 down to the baseplate 96 as desired. The tape hub pin 94 will be substantially fixed at its second end 102, and the flange nibs 110 and 112 will contact the thrust ring 114, when the cover 104 is mounted on the baseplate 96.

Figure 7:
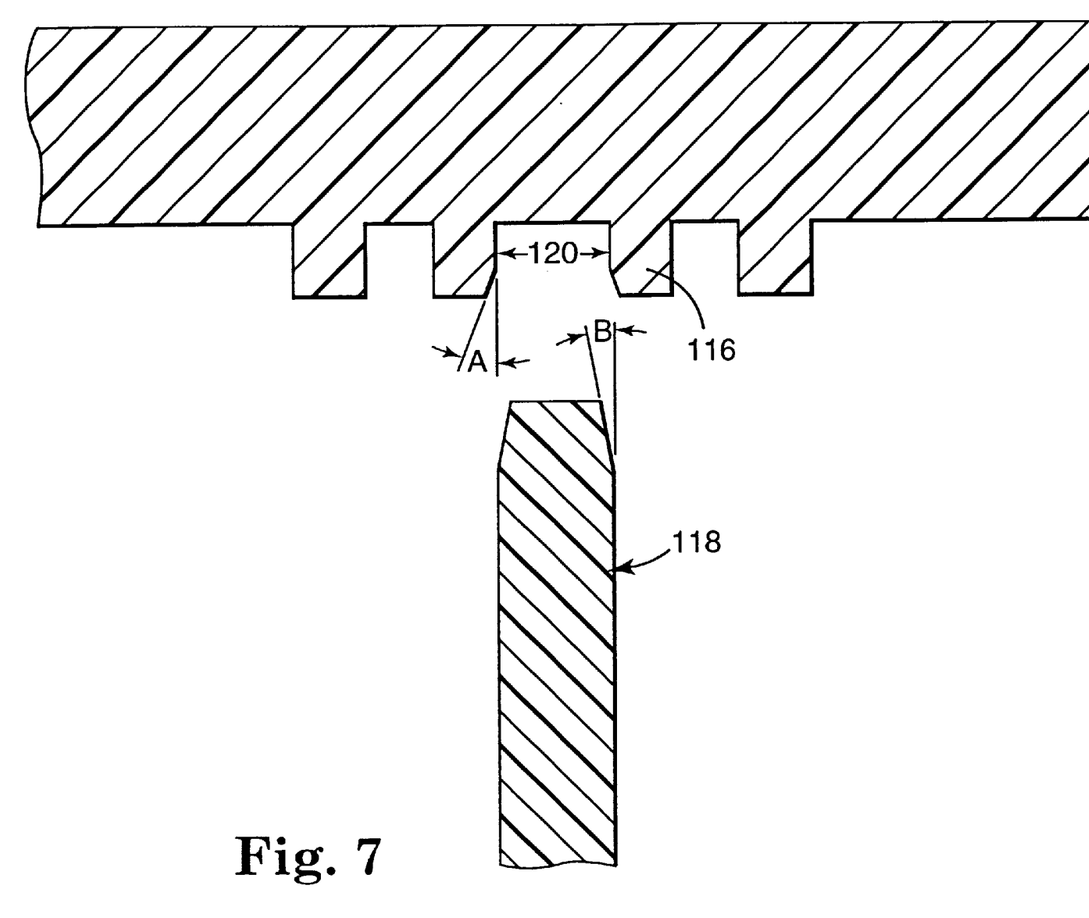
FIG. 7 is an exploded close-up view of a pin retention device and a tape hub pin, both tapered in accordance with a further embodiment of the present invention.

FIG. 7 is an exploded close-up view of a ring-like pin retention device 116 and a tape hub pin 118, both tapered at angles A and B in accordance with a further embodiment of the present invention. Taper angles A and B are chosen to make insertion of the tape hub pin 118 into the annular space 120 of the pin retention device 116 easier.

A number of embodiments of the present invention have been described. Nevertheless, it will be understood that various modifications may be made without departing from the spirit and scope of the invention as defined in the following claims.

What is claimed is:

1. A tape cartridge comprising:
   a cartridge housing including a baseplate and a cover mounted to the baseplate;
   a pin mounted within the housing, wherein the pin has a first end and a second end, both of the first and second ends being substantially fixed to a portion of the cartridge housing;
   a tape hub carrying data storage tape, the tape hub being mounted about the pin for rotation within the cartridge housing, and wherein the baseplate and the cover together define an enclosure for the tape hub and the pin; and
   a spring-biased flange mounted adjacent the second end of the pin, the spring-biased flange being positioned to exert a spring bias between the cover and the tape hub.

2. The cartridge of claim 1, wherein the first end of the pin is mounted to the baseplate and the second end of the pin is mounted to the cover.

3. The cartridge of claim 1, further comprising a pin retention device formed in the cover, wherein the first end of the pin is mounted to the baseplate, and the pin retention device defines a cylindrical recess that retains the second end of the pin.

4. The cartridge of claim 1, further comprising a pin retention device formed in the cover, wherein the first end of the pin is mounted to the baseplate, and the pin retention device includes a ring-like feature that retains the second end of the pin.

5. The cartridge of claim 1, further comprising a ring-like feature formed in the cover adjacent to the pin retention device, wherein the spring-biased flange includes a first flange nib and a second flange nib oriented to contact the ring-like feature when said cover is mounted to the baseplate.

6. The cartridge of claim 5, wherein the ring-like feature is a thrust ring formed in the cover adjacent to the pin retention device, wherein the spring-biased flange includes a first flange nib and a second flange nib oriented to contact the thrust ring when said cover is mounted to the baseplate.

7. The cartridge of claim 1, wherein the data storage tape is magnetic data storage tape.

8. A method for preventing tilt of a tape hub pin in a data tape cartridge, wherein the cartridge includes a tape hub, a baseplate and a cover mounted to the baseplate, and the baseplate and the cover together define an enclosure, the method comprising:

coupling a first end of the pin to the baseplate;

coupling a second end of the pin to the cover; and mounting a spring-biased flange within the enclosure adjacent the second end of the pin, wherein the spring-biased flange exerts a spring bias between the cover and the tape hub;

whereby the pin is generally fixed at both the first end and the second end to thereby resist shock-induced tilt of the pin.

9. The method of claim 8, wherein the tape hub is mounted around the tape hub pin.

10. The method of claim 8, further comprising providing a ring-like feature in the cover, wherein the spring-biased flange exerts the spring bias between the ring-like feature, and loading the tape hub toward the baseplate using force provided by the interaction of the spring biased flange and the ring-like feature.

11. The method of claim 8, further comprising providing a pin retention device in the cover, wherein the pin retention device defines a tapered interior that facilitates insertion and capture of the second end of the pin.

12. The method of claim 11, wherein the second end of the pin is tapered to facilitate insertion into the pin retention device.

* * * * *